(12) United States Patent
Thomas

(10) Patent No.: US 6,553,984 B1
(45) Date of Patent: Apr. 29, 2003

(54) UNIVERSAL FIRERING SHIELD

(75) Inventor: Craig R. Thomas, Cherokee, IA (US)

(73) Assignee: R. J. Thomas Mfg. Co., Inc., Cherokee, IA (US)

( * ) Notice: Subject to any disclaimer, the term of this patent is extended or adjusted under 35 U.S.C. 154(b) by 5 days.

(21) Appl. No.: 09/753,841

(22) Filed: Jan. 3, 2001

(51) Int. Cl.[7] ............................................... A47J 37/07
(52) U.S. Cl. ........................................ 126/29; 126/9 R
(58) Field of Search ............................ 126/25 R, 29, 126/30, 9 R, 9 B, 215

(56) References Cited

U.S. PATENT DOCUMENTS

| | | | | |
|---|---|---|---|---|
| 955,140 A | * | 4/1910 | Cronk | .......................... 126/30 |
| 1,239,150 A | * | 9/1917 | Williams et al. | ............. 126/215 |
| 4,915,091 A | * | 4/1990 | Varney | .......................... 126/29 |
| 5,329,917 A | * | 7/1994 | Young | .......................... 126/29 |
| 5,590,640 A | * | 1/1997 | Kollias et al. | ............. 126/25 R |
| 5,842,463 A | * | 12/1998 | Hall | ............................ 126/29 |
| 5,979,428 A | * | 11/1999 | Greene, Jr. | ................... 126/38 |
| 6,302,095 B1 | * | 10/2001 | Tolley et al. | ............. 126/25 R |

* cited by examiner

Primary Examiner—Sara Clarke
(74) Attorney, Agent, or Firm—McKee, Voorhees & Sease, P.L.C.

(57) ABSTRACT

An improved firering comprising an endless wall firering to encircle the perimeter of a fire area with a firering shield enveloping the firering, with the shield being attached to the firering in spaced apart, heat shielding relationship.

8 Claims, 4 Drawing Sheets

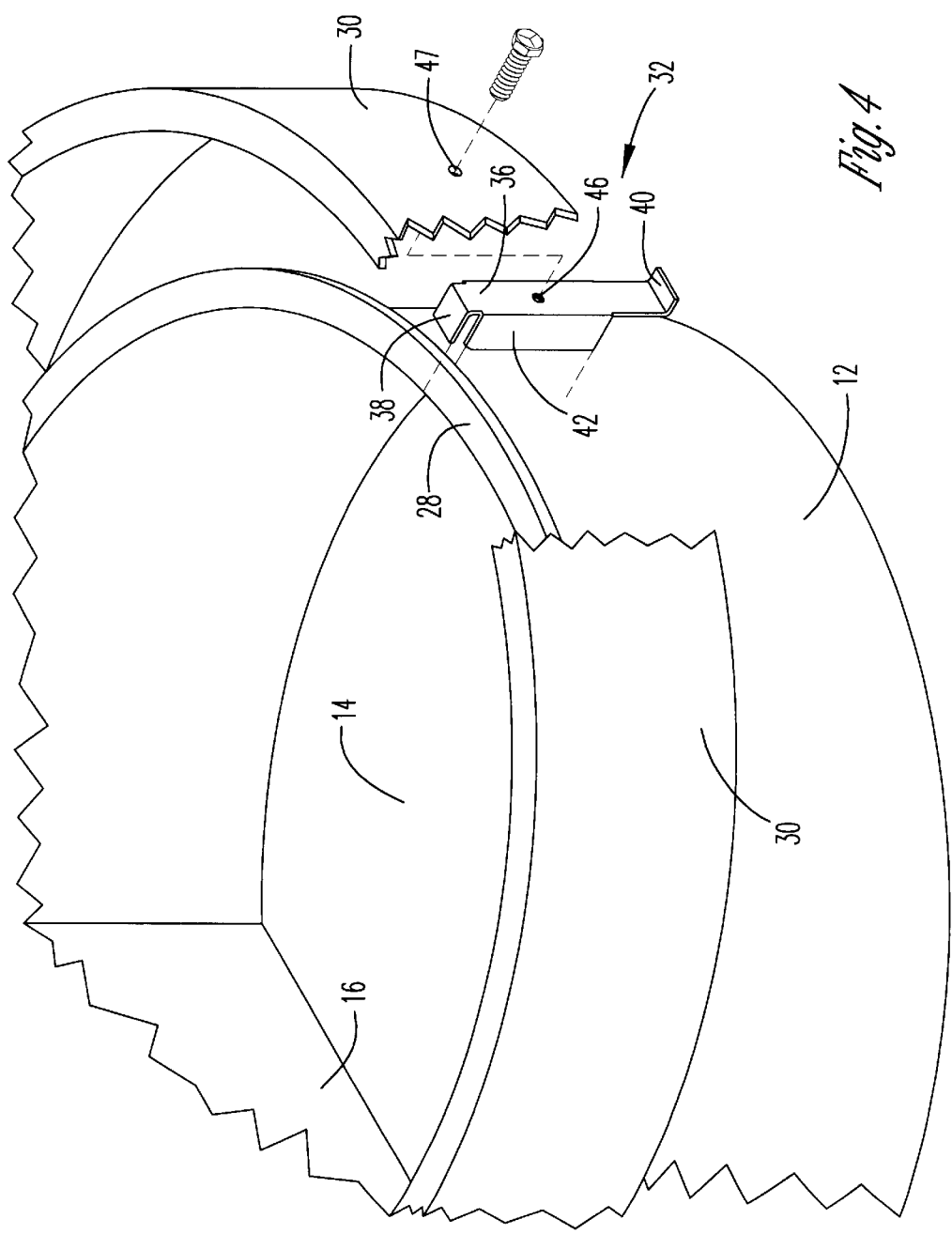

UNIVERSAL FIRERING SHIELD

FIELD OF THE INVENTION

This invention relates to firering shields of universal adaptability, suitable for providing firering shields on new and existing firerings.

BACKGROUND OF THE INVENTION

Outdoor cooking has enjoyed great popularity for many years. County, state and national park services often provide outdoor cooking grills and firerings for use by those participating in recreation in the parks. Such grills and firerings are a tremendous convenience to the recreation enthusiasts, and also a considerable convenience and safety measure to the park administrators in that they assure that fires, and the accompanying mess, are confined to certain areas.

Firerings, and firerings with cantilevered adjustable grills, are known. See, for example, my earlier commonly assigned U.S. Pat. No. 4,403,596, and commonly assigned design U.S. Pat. No. 276,302. Basically, such units feature a cooking grate with some sort of level of adjustment range above the ground or fire level, attached to the firering itself. The firering encircles or envelops the area in which the campfire or cooking fire is contained. Oftentimes such firerings are filled, for example, to about 10 inches above ground level with coarse granular fill material to provide an elevated fire building surface. Drain holes and draft holes are commonly built in and around the perimeter of the firering.

It often happens that in use such firerings are effective, but that the ring itself, after constant exposure to fire and the high temperatures caused by the fire, will itself become quite hot. Thus, a hot firering if touched, for example, by a child, could cause a burn.

It is, therefore, desirable to have firerings which have a heat shield that prevents such burn risk. In this way, one can achieve the advantages of a firering without also the normal attendant risk of burn that may be caused by inadvertent touching.

This invention has as its primary objective providing a firering with a heat shield which minimizes burn risk.

A further object of the present invention is to provide a firering which has universal adaptability such that it can be attached to firerings of original manufacture or installed as an accessory on existing park firerings.

A still further objective of the invention is to provide a universal bracket adaptable for attaching heat shields to firerings of a variety of manufacturers.

A yet further objective of the present invention is to provide a firering and a bracketing system of a universal nature for the widest possible usage with firerings from a variety of manufacturing sources.

Another objective of the present invention is to provide a universal firering bracket of single-piece design which can effectively be stamped from metal sheeting, one stroke which blanks the part, and one stroke which forms the bending of the part.

The method and means of accomplishing each of the above objectives, as well as others, will become apparent from the detailed description of the invention which follows hereinafter.

SUMMARY OF THE INVENTION

This invention relates to an improved firering having an endless wall firering to encircle the perimeter of a fire area in association with a firering shield enveloping the firering, with the shield being attached to the firering in spaced apart, heat shielding relationship. The heat shield is attached by a universal bracket of single-piece construction which can be stamped with one manufacturing stroke and then bent in another manufacturing stroke to form the universal bracket.

BRIEF DESCRIPTION OF THE DRAWINGS

FIG. 4 shows an exploded perspective view of the preferred firering and the details of how the preferred bracket can effectively be used to mount the firering and the heat shield in spaced apart, heat shielding effective relationship.

DETAILED DESCRIPTION OF THE PREFERRED EMBODIMENT

Figure 1A:
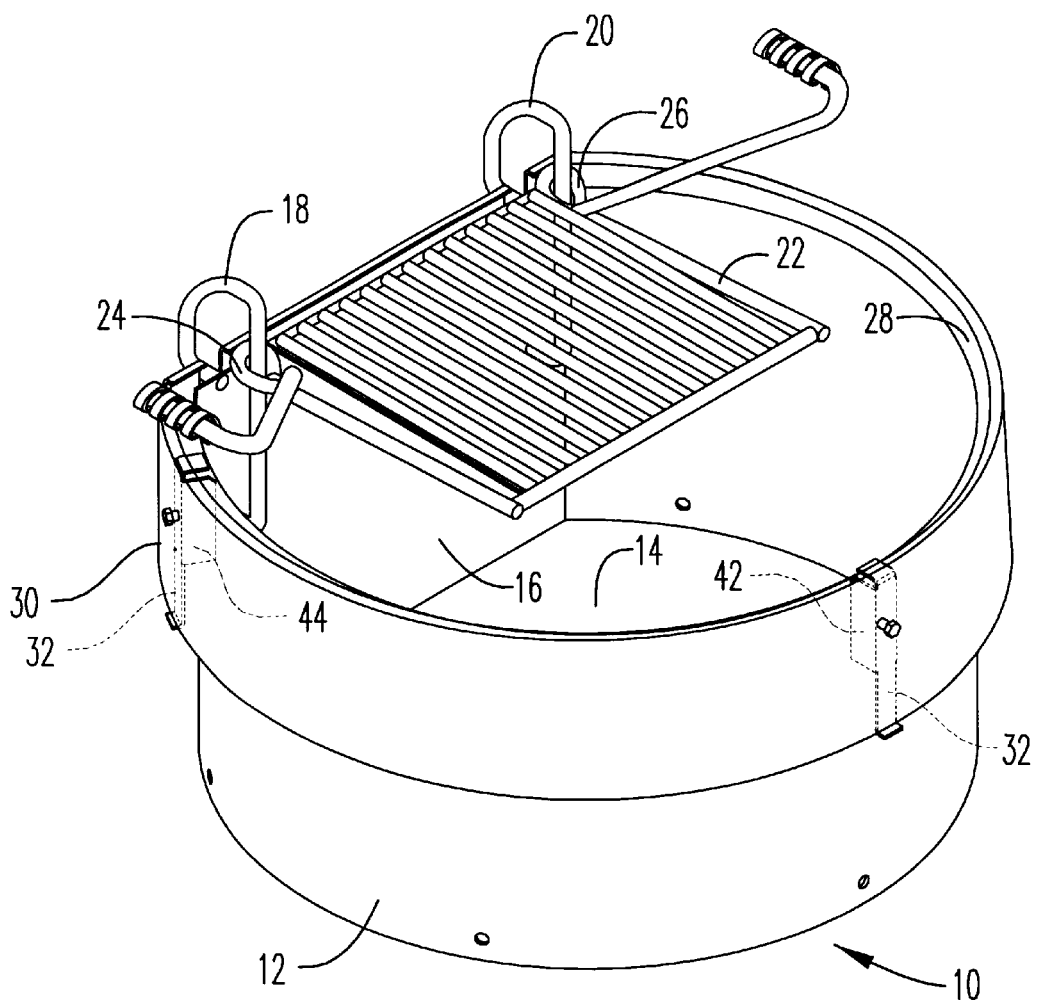
FIGS. 1(*a*) and 1(*b*) are perspective views of a preferred firering with an associated grill and heat shield using the universal brackets.
Figure 1B:
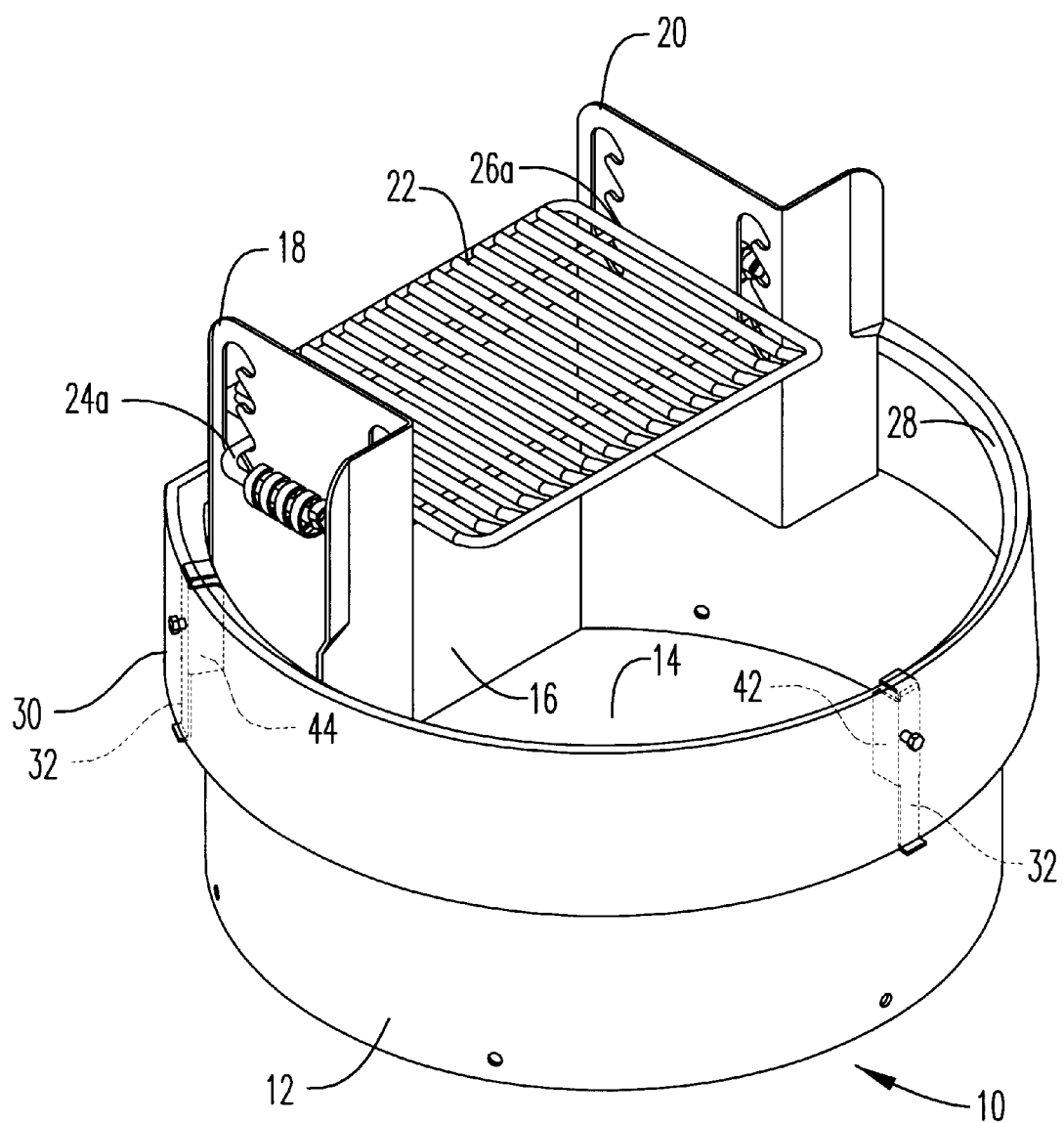

A firering, referred to generally at 10, is comprised of an endless metal wall 12 which encircles a fire area 14. Usually fire area 14 is filled above the ground level with coarse granular fill material (not depicted) to provide an elevated fire-building surface. As depicted in FIG. 1, endless firewall 12 is circular in nature with a rear or back flat panel area 16. Extending upwardly from flat panel area 16 in spaced apart relationship are grate posts or supports 18 and 20. Mounted in adjustable cantilevered fashion (FIG. 1*a*) on the grate posts or supports 18 and 20 is grate 22. Grate 22 on FIG. 1*a* will provide for complete adjustability with regard to its elevation relationship with fire area 14 by simply moving it up or down grate supports or posts 18 and 20. For FIG. 1*a*, it will be held in position by its own weight in a cantilevered jamming or binding relationship between the eyelets 24 and 26 on grate posts 18 and 20. For FIG. 1*b*, the slots in supports 18 and 20 hold the grate and provide four-level adjustment. Numerals 24(*a*) and 24(*b*) of FIG. 1(*b*) reference the bent support arms.

Figure 2:
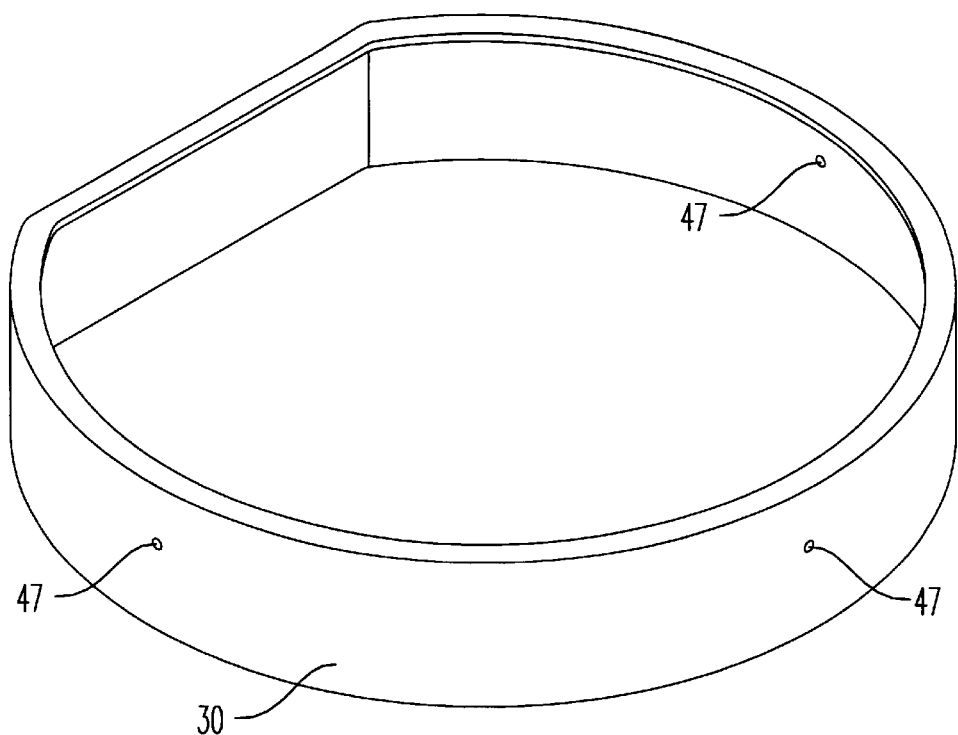
FIG. 2 is a perspective view of the preferred firering.
Figure 3:
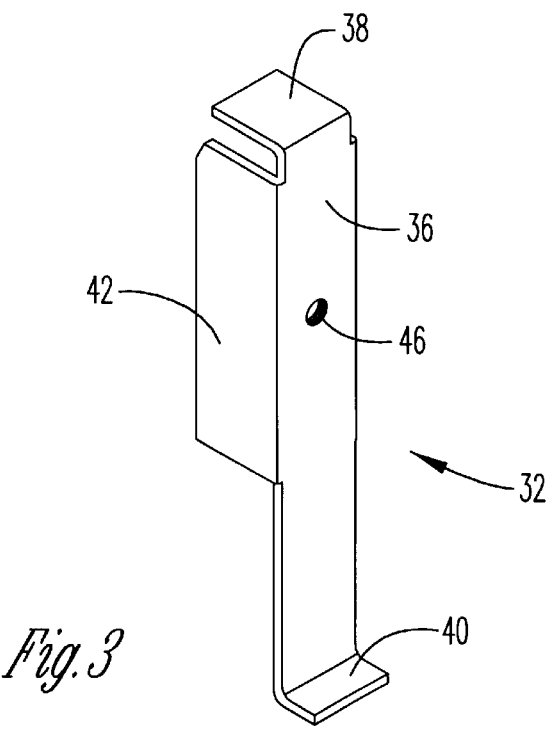
FIG. 3 is a perspective view of the preferred universal bracket.

The top surface of endless wall 12 terminates in a flange 28. In a surrounding and concentric spaced apart perimeter relationship with respect to endless wall 12 of the firering is heat shield 30. Heat shield 30 is mounted in such spaced apart relationship to endless wall 12 by use of spaced apart universal brackets 32. A plurality of brackets 32 are used. For example, FIG. 2 shows a heat shield 30 which contemplates three spaced apart brackets 32. As shown in FIGS. 1 and 2, heat shield 30 terminates at its upper edge in a top perimeter in an inwardly projecting flange 28.

Bracket 32 is comprised of a strap portion 36, a top inwardly projecting tab 38, a bottom rearwardly projecting tab 40, and a pair of spaced apart, inwardly projecting spacing walls 42 and 44. Strap 36 has a central aperture 46 threaded to hold a fastening bolt.

As best illustrated in FIG. 1, when brackets 32 are placed in position with tab 38 grasping flange 28 and tab 40 supporting the bottom edge of heat shield 30, a bolt is threaded through apertures 47 of the firering heat shield, through a hole 46 in strap 36 to securely engage the heat shield, holding the heat shield and aligned hole of the firering (not depicted) against wall 12.

As can be readily seen, bracket 36 can be universally mounted to any firering by simply drilling side holes in the firering to align with the heat shield holes to accommodate the brackets 32. Brackets 32 themselves can be stamped from a single metal sheet and bent with a single die stroke, as is apparent to a toll and die maker.

It therefore can be seen that the invention accomplishes at least all of its stated objectives. In particular, the bracket 32 and its opposing spaced apart sidewalls 42 and 44 hold the heat shield in spaced apart relationship from the endless wall firering 10. The spacing between firering 10 and the heat shield 30 acts as a further insulating area, and as a result, touching the heat shield will not cause the severe risk to burn that could potentially happen with touching the firering 10. It therefore can be seen that the invention accomplishes all of its stated objectives.

What is claimed is:

1. An improved firering, comprising:
    an endless wall firering to encircle the perimeter of a fire area;
    a firering shield having an upper edge inwardly flanged at said upper edge to present a stiffened, smooth rounded edge enveloping said firering;
    said firering shield being attached to said firering in a spaced apart, heat shielding relationship.

2. The firering of claim 1 wherein said firering shield is attached to said firering in a spaced apart relationship by a mounting bracket having top and bottom ends and a spacer.

3. The firering of claim 2 wherein said mounting bracket top end is adapted to grip a top perimeter edge of the firering.

4. The firering of claim 3 wherein said mounting bracket bottom end is adapted to grip a bottom perimeter edge of said heat shield.

5. The improved firering of claim 2 wherein the bracket is a single piece bracket.

6. The improved firering of claim 1 wherein the firering and firering shield each have a flat panel area at a rear part of said firering and said shield, respectively.

7. The improved firering of claim 6 which has a cooking grate, adjustably attached to said flat panel area of the firering.

8. An improved firering, comprising:
    an endless wall firering to encircle the perimeter of a fire area, said firering having a circular area and a flat panel;
    a cook grate adjustably attached to the flat panel of the firering;
    a firering shield enveloping said firering;
    said firering shield being attached to the firering in a spaced apart, heat shielding relationship.

* * * * *